(12) United States Patent
Johansson

(10) Patent No.: US 12,390,919 B2
(45) Date of Patent: Aug. 19, 2025

(54) FLATBED APPLICATOR AND RELATED METHOD

(71) Applicant: Moditech Scandinavia AB, Karlstad (SE)

(72) Inventor: Patrick Johansson, Karlstad (SE)

(73) Assignee: Moditech Scandinavia AB, Karlstad (SE)

( * ) Notice: Subject to any disclaimer, the term of this patent is extended or adjusted under 35 U.S.C. 154(b) by 0 days.

(21) Appl. No.: 18/716,521

(22) PCT Filed: Dec. 21, 2022

(86) PCT No.: PCT/SE2022/051218
§ 371 (c)(1),
(2) Date: Jun. 5, 2024

(87) PCT Pub. No.: WO2023/121551
PCT Pub. Date: Jun. 29, 2023

(65) Prior Publication Data
US 2025/0033186 A1  Jan. 30, 2025

(30) Foreign Application Priority Data
Dec. 23, 2021  (SE) .................... 2130377-1

(51) Int. Cl.
*B25H 1/02* (2006.01)
*B32B 38/18* (2006.01)
*B32B 41/00* (2006.01)

(52) U.S. Cl.
CPC ...................... *B25H 1/02* (2013.01)

(58) Field of Classification Search
CPC ....... B25H 1/02; B32B 37/0053; B32B 37/10; B32B 37/1054; B32B 41/00; B32B 38/18
See application file for complete search history.

(56) References Cited

FOREIGN PATENT DOCUMENTS

| CN | 1522838 A | * | 8/2004 | |
| EP | 1522838 A2 | * | 4/2005 | ............. A61N 1/378 |

(Continued)

OTHER PUBLICATIONS

Everything you need to know about stepper motors (online) Orientalmotor Feb. 2016.

(Continued)

*Primary Examiner* — Bayan Salone
(74) *Attorney, Agent, or Firm* — Christian D. Abel

(57) ABSTRACT

Flatbed applicator comprising a table having a working surface (23), a roller (30), and a roller support structure (40) having a carriage configured to guide the roller between a raised configuration in which the roller is separated from the surface and a second, clamped configuration in which the roller is actively pressed against the surface. A pair of shuttles rotatably carry the roller and, for each shuttle, an actuating unit comprising a rotatable actuator shaft is configured to linearly actuate the shuttle, the actuator shaft being rotatably actuated by a stepping motor. A switch is configured to be activated when the roller is brought into direct or indirect contact with the surface to trigger the stepping motor to perform a predetermined number of final stepping motor steps to press the roller against the surface to bring the roller to the clamped configuration. A related method is also disclosed.

16 Claims, 7 Drawing Sheets

(56) References Cited

FOREIGN PATENT DOCUMENTS

| EP | 3175986 A1 | * | 6/2017 | ......... B32B 37/0007 |
| WO | WO-2012154061 A1 | * | 11/2012 | ........... B29C 63/024 |
| WO | WO-2020078644 A1 | * | 4/2020 | ............. A47B 13/02 |

OTHER PUBLICATIONS

WOISA in PCT/SE2022/051218, submitted inter alia as a statement of relevance for any non-English references cited therein.
ISR inn PCT/SE2022/051218, submitted inter alia as a statement of relevance for any non-English references cited therein.
Search Report from Swedish PAtent Office in Application 2130377-1, submitted inter alia as a statement of relevance for any non-English references cited therein.

* cited by examiner

FLATBED APPLICATOR AND RELATED METHOD

The present invention relates to a flatbed applicator and a related method.

From WO2020078644A1 there is known flatbed applicator comprising a table and a roller movably guided vertically and horizontally along the table by means of post members. A horizontal guiding structure comprising fixed parallel profiles is attached to the table and guide members fixedly attached to a support structure carrying each of the post members. Each of the post members includes a vertically moveable support structure and a vertical guiding arrangement arranged to guide the vertically moveable support structure. The roller comprises shaft ends that are connected to the vertically moveable support structure. A power unit and transmission are arranged to enable vertical movement of the vertically moveable support structure, wherein the power unit is in the form of a motor attached to the support structure and arranged under the table. The transmission is in the form of a single reduction gear mechanism attached to the transversal support member and the single reduction gear mechanism is arranged to synchronously transmit torque to one or a pair of drive shafts, which via a mechanical transmission drives the vertically movable support structure.

Although the arrangement disclosed in WO2020078644A1 may be sufficient the actuate the roller vertically in many circumstances, it is generally desirable to increase the reliability and accuracy of the vertical movement of the roller. Also, it is desirable to accurately control the clamping pressure of the roller, i.e. the pressure by which the roller is brought to press down onto the table or onto a workpiece positioned on the table.

An object of the present disclosure is to mitigate at least some of these problems.

Another object of the present disclosure is to provide a flatbed applicator, as well as a related method, which allow accurate control of vertical movement of the roller.

Another object of the present disclosure is to provide a flatbed applicator and a related method having alternative and/or improved means for actuating the roller vertically.

A further object of the present disclosure is to provide a flatbed applicator and a related method having alternative and/or improved means for accurately controlling and/or adjusting clamping pressure of the roller.

According to one aspect, the present disclosure provides a flatbed applicator comprising:
  a table comprising a tabletop displaying a substantially planar working surface;
  a roller; and
  a roller support structure comprising:
    a carriage configured to guide the roller in a first, rolling plane being substantially parallel to the working surface; and
    an actuating arrangement configured to guide the roller in a second, clamping plane being substantially orthogonal to the working surface between a first, raised configuration in which the roller is separated from the working surface and a second, clamped configuration in which the roller is actively pressed against the working surface or against an intermediate object, e.g. a workpiece, laying on the working surface.
The actuating arrangement comprises:
a pair of shuttles rotatably carrying the roller; and
for each shuttle in said pair of shuttles:
    an actuating unit comprising a rotatable actuator shaft configured to linearly actuate the shuttle in said clamping plane, the actuator shaft being rotatably actuated by a stepping motor; and
    a switch configured to be activated when the roller is brought into direct or indirect contact with the working surface to trigger or instruct the stepping motor to perform a predetermined number of final stepping motor steps to press the roller directly or indirectly against the working surface to bring the roller to the clamped configuration.

Each shuttle may be associated with its own switch. For example, the pair of shuttles may comprise:
  a first shuttle rotatably carrying the roller at a first end of the roller and a second shuttle rotatably carrying the roller at a second end of the roller,
  and the actuating arrangement may comprise:
    a first actuating unit comprising a first rotatable actuator shaft configured to linearly actuate the first shuttle in said clamping plane, the first actuator shaft being rotatably actuated by a common stepping motor or by a first stepping motor;
    a first switch being configured to be activated when the first actuating unit brings the roller into direct or indirect contact with the working surface to trigger or instruct the stepping motor actuating the first actuator shaft to perform a predetermined number of final stepping motor steps to press the roller directly or indirectly against the working surface to bring the roller to the clamped configuration;
    a second actuating unit comprising a second rotatable actuator shaft configured to linearly actuate the second shuttle in said clamping plane, the second actuator shaft being rotatably actuated by the common stepping motor or by a second stepping motor; and
    a second switch configured to be activated when the roller is brought into direct or indirect contact with the working surface to trigger or instruct the stepping motor actuating the second actuator shaft to perform a predetermined number of final stepping motor steps to press the roller directly or indirectly against the surface to bring the roller to the clamped configuration.

Each shuttle may be operated by the same, common, stepping motor, e.g. via a suitable linkage mechanism connecting to the actuator shaft of both shuttles.

Preferably, however, each shuttle is operated by an individual stepping motor. Consequently, the pair of shuttles may comprise:
  a first shuttle rotatably carrying the roller at a first end of the roller and a second shuttle rotatably carrying the roller at a second end of the roller,
  and the actuating arrangement may comprise:
    a first actuating unit comprising a first rotatable actuator shaft configured to linearly actuate the first shuttle in said clamping plane, the first actuator shaft being rotatably actuated by a first stepping motor;
    a first switch configured to be activated when the roller is brought into direct or indirect contact with the surface to trigger or instruct the first stepping motor to perform a predetermined number of final stepping motor steps to press the roller directly or indirectly against the surface to bring the roller to the clamped configuration;
    a second actuating unit comprising a second rotatable actuator shaft configured to linearly actuate the second shuttle in said clamping plane, the second actuator shaft being rotatably actuated by a second stepping motor; and a second switch configured to be activated when the roller is brought into direct or indirect contact with the surface to trigger or instruct the second stepping motor to perform a predetermined number of final stepping motor steps to press the roller directly or indirectly against the surface to bring the roller to the clamped configuration.

Consequently, each shuttle may be associated with its own, individual stepping motor and with its own, individual switch.

During a clamping operation, i.e. when the roller is brought from the first, raised configuration to the second, clamped configuration, one of said first and second switches may be activated prior to the other of said first and second switches, in which case the first activated switch may be configured to trigger or instruct the first stepping motor and the second stepping motor to perform said predetermined number of final stepping motor steps synchronically and/or in unison. In such a case, the second switch to be activated may not trigger or instruct any one of the stepping motors to perform said predetermined number of final stepping motor steps (since the first switch to be activated has already tiggered the stepping motors to perform such final stepping motor steps).

Consequently, both the first switch and the second switch may be configured to be activated when the roller is brought into direct or indirect contact with the surface to trigger or instruct the first stepping motor and the second stepping motor to perform said predetermined number of final stepping motor steps synchronically and/or in unison, although in a clamping operation only one of the switches may actually be activated to trigger the predetermined number of final stepping motor steps. This will allow the clamping operation to account for any workpiece on the surface being positioned of-centre, i.e. closer to one end of the roller, in which case the roller, at the end where the workpiece it positioned, may be brought into contact with the workpiece prior to the roller at the other end, where no workpiece it positioned, is brought into contact with the surface. This provides a precise and predictable clamping force being applied during the clamping operation.

According to another aspect, the present disclosure provides a method of actuating a roller in a flatbed applicator in a clamping plane which is substantially orthogonal to a substantially planar working surface of a table of the flatbed applicator, wherein the method comprises the steps of:
using a stepping motor, actuating the roller into direct or indirect contact with the working surface; and
upon said direct or indirect contact between the roller and the surface, triggering or instructing the stepping motor to perform a predetermined number of final stepping motor steps to press the roller directly or indirectly against the surface to bring the roller to a clamped configuration.

The flatbed applicator may comprise:
a pair of shuttles rotatably carrying the roller; and
for each shuttle in said pair of shuttles:
an actuating unit comprising a rotatable actuator shaft configured to linearly actuate the shuttle in said clamping plane, the actuator shaft being rotatably actuated by a stepping motor; and
a switch configured to be activated when the roller is brought into direct or indirect contact with the surface to trigger or instruct the stepping motor to perform a predetermined number of final stepping motor steps to press the roller directly or indirectly against the surface to bring the roller to the clamped configuration, and the method may comprise the steps of:
the switch being activated upon said direct or indirect contact between the roller and the working surface, and
the switch, upon being activated, triggering or instructing the stepping motor to perform said predetermined number of final stepping motor steps.

Consequently, when the switch is activated, the stepping motor is instructed to perform a predetermined number of additional stepping motor steps and then stop.

The method may comprise the steps of:
actuating the roller into direct or indirect contact with the working surface using:
a first stepping motor or a common stepping motor configured to actuate the first actuator shaft; and
a second stepping motor or the common stepping motor configured to actuate the second actuator shaft; and
upon said direct or indirect contact between the roller and the working surface, triggering or instructing the common stepping motor to perform said predetermined number of final stepping motor steps, or triggering or instructing the first stepping motor and the second stepping motor to perform said predetermined number of final stepping motor steps synchronically and/or in unison.

The clamped configuration is a configuration in which the roller is actively pressed against the working surface or against an intermediate object, e.g. a workpiece, laying on the surface. In other words, when the roller is actively pressed against the working surface or against an intermediate object, e.g. a workpiece, laying on the working surface, the roller is under the influence of forces going beyond gravitational forces acting on the roller. "Pressing indirectly" denotes that the roller is pressing onto the working surface via an intermediate object, e.g. a workpiece, laying on the working surface.

Between the raised and the clamped configurations, the roller may be in a resting configuration, in which the roller rests on the working surface without being actively biased against the surface, e.g. resting on the surface solely under the influence of gravitational forces. Said activation of the switch may take place when the roller is in or brought to the resting configuration.

The vertical travel of the shuttle between the raised configuration and the clamped configuration may typically be within the range of 50-200 mm.

As is known in the art, a stepping motor, also known as a step motor or a stepper motor, is a brushless DC electric motor that divides a full rotation of a rotor axis into a number of equal stepping motor steps. The motor's position can be commanded to move and hold at one of these steps without any position sensor for feedback, e.g. using an open-loop or a non-feedback controller. Consequently, the final clamping pressure will be determined by the number of stepping motor steps effectuated after the switch is triggered. Consequently, the predetermined number of final stepping motor steps will determine the clamping force or clamping pressure of the roller. By increasing the predetermined number of final stepping steps, a higher pressing force can be achieved and vice versa. At the end of the sequence of the predetermined number of final stepping motor steps, the stepping motor will stop and the roller will be held in the clamped configuration by virtue of the inherent ability of the stepping motor to hold a step position. Consequently, said activation of the switch triggers the stepping motor to initiate a predetermined number of final stepping motor steps, which stepping motor steps brings the roller to assert an increasing pressing force directly or indirectly onto the working surface until the last stepping motor step is completed and the clamping pressure is maintained by the stepping motor holding its step position.

If each shuttle is actuated by its own stepping motor, the stepping motors are advantageously operated synchronically and/or in unison when the roller is brought from the raised position to the resting position.

According to one embodiment, the pulse rate of the stepping motor(s) may be configured to change when the switch is activated, e.g. to allow the roller to operate at a lower descent rate after the switch is activated.

The actuating arrangement may provide input means allowing an operator to adjust the predetermined number of final stepping motor steps, thus allowing the operator to set the desired clamping pressure. This arrangement provides a precise way of setting a desired pressing force or linear pressure of the roller without having to implement a feedback loop measuring the pressing force or linear pressure.

The stepping motor(s) may be controlled by a stepping motor controller. The stepping motor controller may comprise a central processing unit, e.g. a computer or a micro controller. The stepping motor controller may be connected to input means, e.g. an input unit or control buttons, allowing an operator to input instructions to the controller, e.g. instructions to lower or raise the roller, or sett operating parameters, e.g. desired clamping pressure. The stepping motor controller may be connected to output means, e.g. a display, allowing the operator to receive information on set parameter values or confirmations on input commands.

If each shuttle is actuated by its own stepping motor, the stepping motor controller may be configured to monitor the switch associated with each actuating unit and, upon receiving an activation signal from one of the switches indicating that the roller has been brought into direct or indirect contact with the working surface, instruct both stepping motors to perform said predetermined number of final stepping motor steps in parallel to bring the stepping motors to actuate the shuttles in unison.

The actuating unit associated with each shuttle may be movably arranged in relation to the carriage to allow the actuating unit, when the roller is brought into direct or indirect contact with the surface, to move in relation to the carriage to activate said switch. In other words, the actuating unit may be movably arranged in relation to the carriage to allow the actuating unit, when the roller is brought into direct or indirect contact with the surface, to activate the switch to trigger or instruct the stepping motor to perform the predetermined number of final stepping motor steps to press the roller directly or indirectly against the surface to bring the roller to the clamping configuration.

The rotatable actuator shaft may be a ball screw shaft configured to interact with a ball screw nut being connected to the shuttle. The actuating arrangement may be arranged in the carriage. The stepping motor associated with each actuating unit may be supported by the actuating unit. The switch may be fixedly attached to the carriage or to the actuating unit.

In normal operation of the flatbed applicator, the surface is typically horizontally orientated, and the carriage is configured to guide the roller horizontally over the table, and the actuating arrangement is configured to guide the roller vertically over the table.

According to one aspect, the present disclosure provides an actuating arrangement comprising a pair of shuttles rotatably carrying the roller and a pair of actuating units configured to actuate the shuttles (and consequently also the roller carried by the shuttles) in a clamping plane, wherein a first actuating unit of said pair of actuating units is configured to actuate a first shuttle of said pair of shuttles in said clamping plane, and a second actuating unit of said pair of actuating units is configures to actuate a second shuttle of said pair of shuttles in said clamping plane. Preferably, the roller comprises a shaft having a first and a second shaft pin resting in a rotational bearing in the first and the second shuttle, respectively.

When the roller is to be actuated in the clamping plane, the stepping motor associated with each actuating unit may bring the actuator shaft to rotate. The rotational movement of the actuator shaft is translated into a linear motion of the shuttle, thus actuating the shuttle in the clamping plane. The rotatable actuator shaft may preferably be a ball screw shaft configured to interact with a ball screw nut being connected to the shuttle. However, any type of mechanism allowing transfer of rotational movement to translational movement can be used. The actuating arrangement may comprise a stepping motor controller configured to control the stepping motor associated with each actuating unit. The stepping motors associated with the actuating units may be configured to operate synchronically and/or in unison, thus allowing the first and second shuttles also to move in unison. When the roller is brought into direct or indirect contact with the surface, the actuating arrangement may be configured to allow each actuating unit to move in said actuating direction to trigger the stepping motor to effectuate a predetermined number of final stepping motor steps to actively press the roller directly or indirectly against the surface.

Said shuttle may comprise a frame member and first and second brackets, wherein each bracket is fixedly attached to the frame member, and wherein said switch is supported by the second bracket. The actuating unit may comprise first and second guide rods, first and second bearing plates and a motor mounting plate. The guide rods may be horizontally supported by but arranged vertically movable in the first and second brackets. The actuator shaft may be rotatably supported by but horizontally fixedly arranged in the first and second bearing plates. The first and second bearing plates and the motor mounting plate may be fixedly attached to the guide pipes. The stepping motor may be supported by the motor mounting plate.

The second bracket may be arranged below the second bearing plate limiting vertical movement of the actuating unit in the downward direction. The second bracket may be arranged above the motor mounting plate limiting vertical movement of the actuating unit in the upward direction.

The roller support structure may comprise substantially vertical post members extending upwards from a substantially horizontal beam extending transversally under the tabletop. The post members extend above the surface and an actuating arrangement, e.g. the above-discussed actuating arrangement, may be arranged to actuate the roller between a first, raised position, a second, resting position and a third, clamped position. In the raised position, the roller is its uppermost position, raised above the surface. In the resting position, the roller rests directly or indirectly on the surface, directly or indirectly affecting the surface with the weight of the roller assembly. "Resting indirectly" here denotes that the roller rests on an object positioned on the table, e.g. a workpiece to be operated on by the roller. In the clamping position the roller directly or indirectly asserts a pressing force onto the surface. "Pressing force" here denotes a force going beyond a force resulting from the weight of the roller assembly.

A shuttle, e.g. the above-discussed shuttle, may be arranged vertically movable in each post member. An actuating unit, e.g. the above-discussed actuating unit, may be arranged to actuate the shuttle vertically in the post member. The actuating unit may comprise a rotatable actuator shaft, e.g. the above-discussed actuator shaft, which is rotatably arranged in the actuating unit, but which is otherwise fixedly arranged in the same.

The actuator shaft is connected to and driven by a stepping motor. A gearbox may be arranged between the stepping motor and the actuator shaft. The actuator shaft may form a linear drive for the shuttle, wherein a rotational motion of the stepping motor is transformed to a vertical-linear motion of the shuttle. To realise said linear drive, the rotatable actuator shaft may be a ball screw shaft configured to interact with a ball screw nut arranged in the shuttle.

The actuating unit may be arranged in the post member such that it can move vertically in relation to the post member. The post member may comprise a first, upper stopper restricting upwards movement of the actuating unit in the post member, and a second, lower stopper restricting downwards movement of the actuating unit in the post member. Consequently, the upper and lower stoppers define upper and lower end positions of the actuating unit, between which end positions the actuating unit can travel vertically in the post member. This vertical travel may be within the range of 1-5 mm, e.g. 3 mm.

The stepping motor may be carried by the actuating unit, thus being arranged to travel vertically together with the actuating unit between said upper and lower end positions.

The actuating arrangement may comprise a switch, e.g. the above-discussed switch. The switch may be configured to be triggered when the actuating unit approaches or reaches the upper end position.

The switch may be arranged in the post member or in the actuating unit. The switch may be a contact switch detecting when being brought into physical contact with the actuating unit (if the switch is arranged in the post member) or the post member (if the switch is arranged on the actuating unit). Alternatively, the switch may be a proximity switch detecting when being within a predetermined distance from the actuating unit (if the switch is arranged in the post member) or within a predetermined distance from the post member (if the switch is arranged on the actuating unit).

In order to bring the roller from the raised position to the resting position, an operator activates the stepping motor which, via the actuator shaft, lowers the shuttle such that the roller comes to rest, directly or indirectly, on the surface. During this actuation phase, the actuating unit will be in its lower end position due to the combined weight of the actuating unit and the shuttle and roller assembly. In other words, the actuating unit will be in contact with lower stopper of the post member when the roller is brought from the raised position to the resting position.

Once in the resting position, however, the roller cannot move further downwards and, as a consequence, continued rotation of the actuator shaft will cause the actuating unit to move upwardly, i.e. to leave its lower end position. This upward movement of the actuating unt will continue until the actuating unit reaches its upper end position, at which point in time a continued rotation of the actuator shaft will assert an increasing pressing force, or linear load, directly or indirectly onto the surface until rotation of the stepping motor is brought to stop and the final clamping position is arrived at.

The switch is configured to be activated when the actuating unit reaches the upper end position or any predefined intermediate position between the lower end position and the upper end position. Activation of the switch triggers the stepping motor to initiate a predetermined number of final stepping motor steps, which stepping motor steps brings the actuating unit into its upper end position (if the switch is activated prior to the activating unit reaching the upper end position) and then, upon the actuating unit reaching its upper end position, brings the roller to assert an increasing pressing force directly or indirectly onto the surface until the last stepping motor step is completed. Consequently, the final clamping pressure will be determined by the number of stepping motor steps effectuated after the switch is triggered or, in other words, by the predetermined number of final stepping motor steps.

As previously mentioned, the actuating arrangement may provide an input unit allowing an operator to adjust the predetermined number of final stepping motor steps, thus allowing the operator to set the desired clamping pressure.

The actuating arrangement may comprise, for each shuttle, a further switch arranged to detect when the shuttle is in an uppermost position. The further switch may be arranged on the shuttle or be fixedly attached to the post member. Like the first-mentioned switch, the further switch may be a contact switch or a proximity switch.

The above-discussed aspects may be used in any combination with each other.

Following drawings are appended to facilitate the understanding of the disclosure and the invention as it is defined in the claims.

Figure 1:
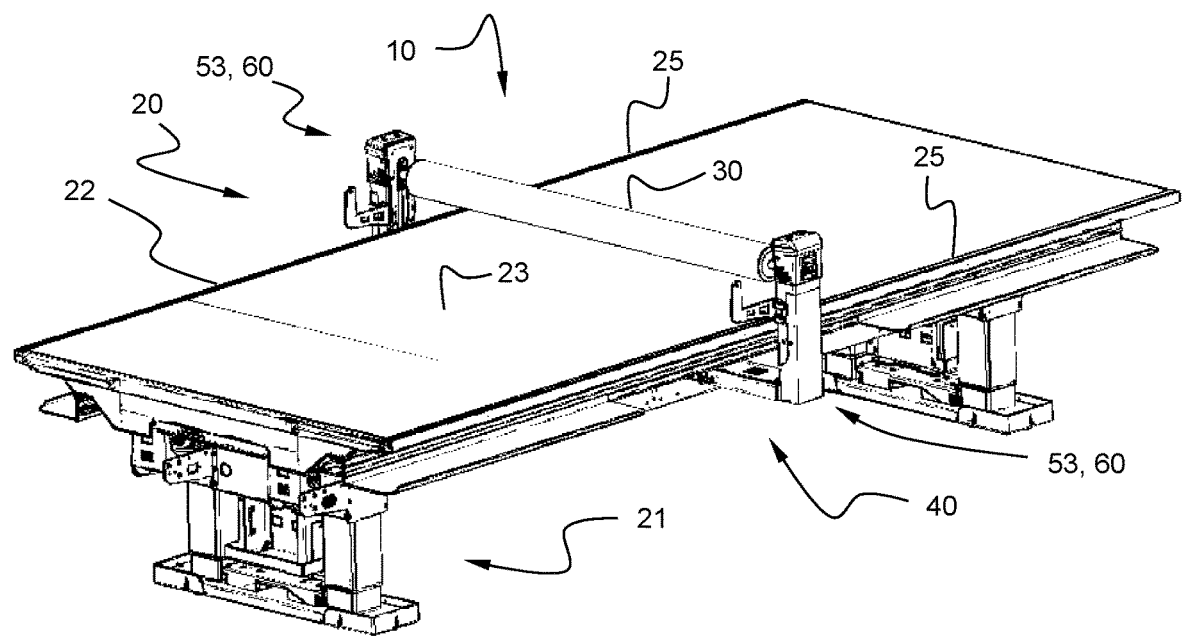
FIG. 1 shows a perspective view of a flatbed applicator according to a first embodiment of the disclosure.
Figure 2:
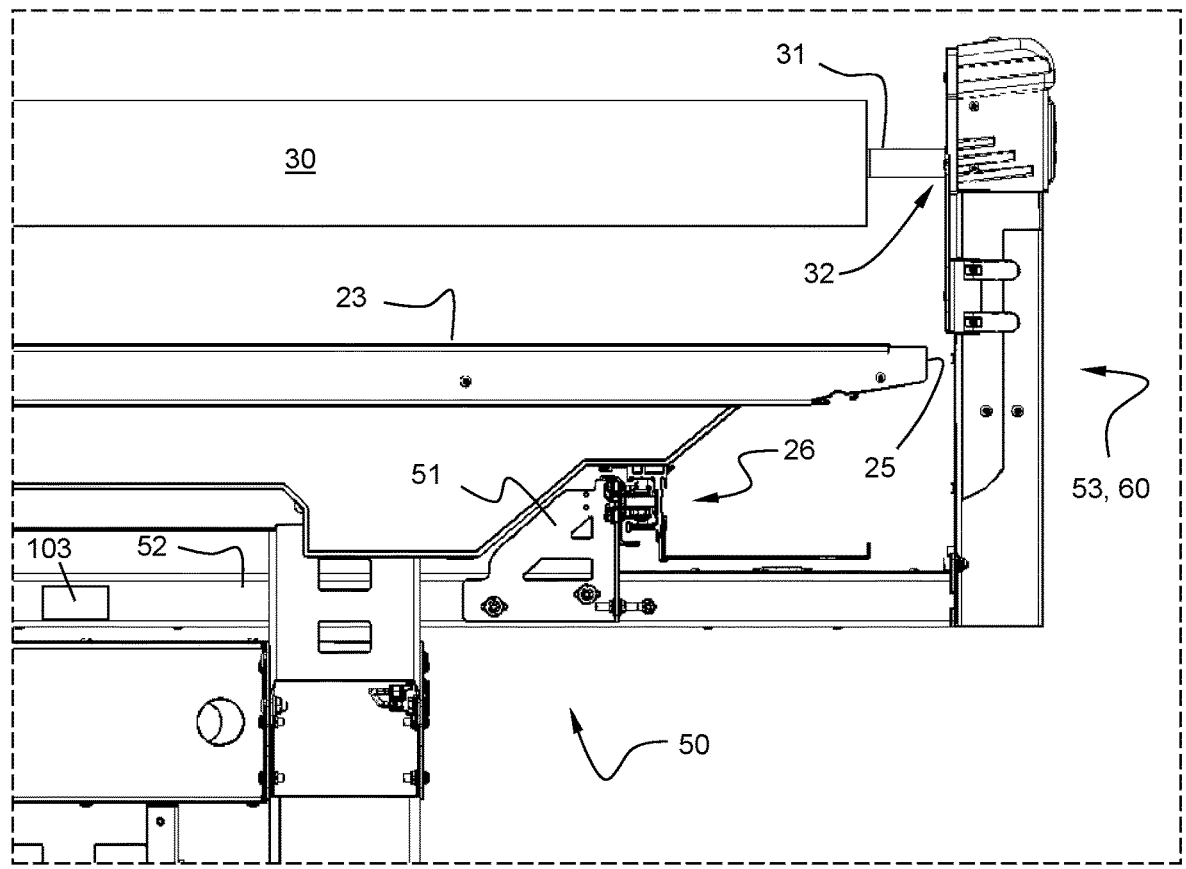
FIG. 2 is a detailed side view of the flatbed applicator according to FIG. 1.
Figure 3:
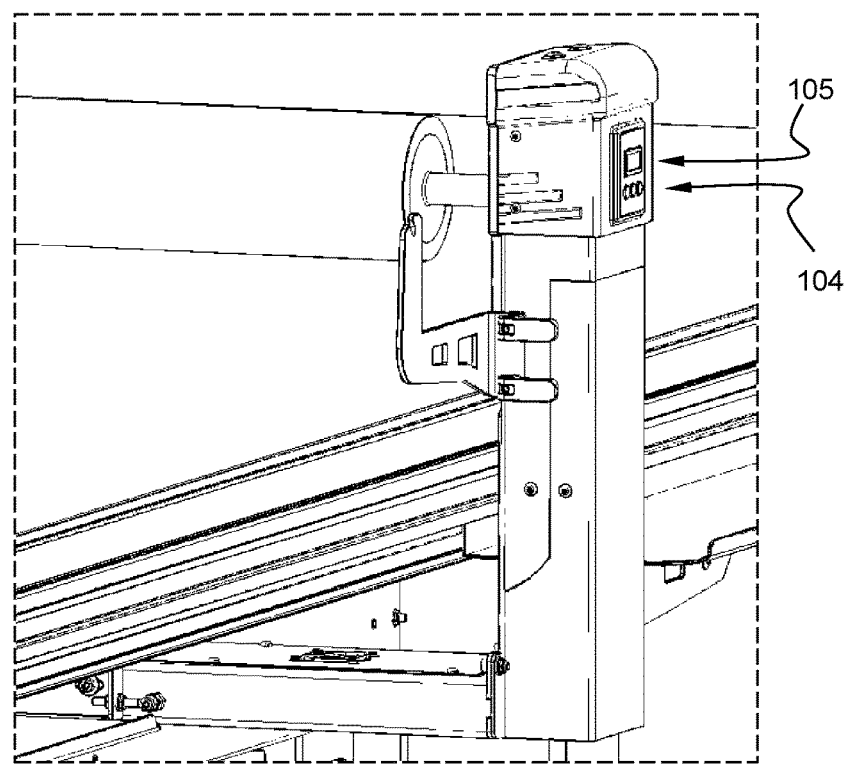
FIGS. 3-9 show detailed views of a post member of the flatbed applicator according to FIGS. 1 and 2.
Figure 4:
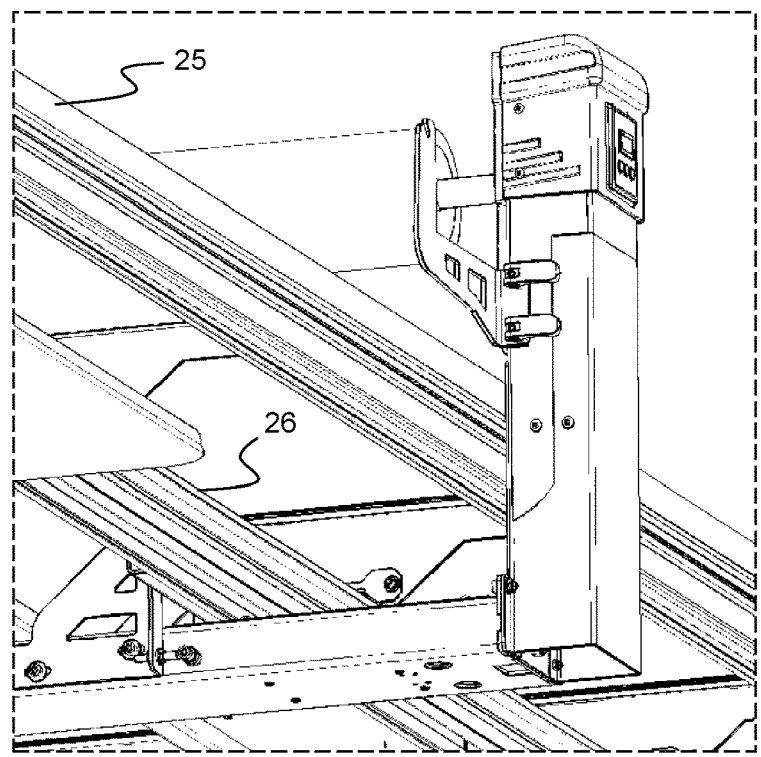

FIGS. 1 and 2 show an embodiment of flatbed applicator 10 comprising a table 20, a roller 30 and a roller support structure 40 configured to guide the roller 30 horizontally and vertically across the table 20.

The roller 30 comprises a shaft 31 having shaft pins 32 allowing the roller support structure 40 to rotatably carry the roller 30.

The table 20 comprises a leg arrangement 21 and a tabletop 22 supported by the leg arrangement 21. The tabletop 22 displays a substantially planar top or working surface 23.

The table 20 further comprises two longitudinal and parallel guide rails 26 attached underneath the tabletop 22 adjacent each longitudinal side 25 of the table 20. In the figures, only one of the guide rails is visible. The guide rails 26 provide support for horizontal movement of the roller 30.

The roller support structure 40 comprises a carriage 50 arranged to travel linearly and horizontally along the guide rails 26. The carriage 50 is configured to guide the roller 30 in a first, rolling plane being substantially parallel to the working surface 23. The carriage 50 comprises first sections 51 forming slides arranged to slide or roll along the guide rail 26. In the figures only one slide is visible. The carriage 50 further comprises a second section 52 forming a horizontal beam extending transversally across the table 20 under the tabletop 22. The beam 52 is connected to the slides 51 and extends beyond of the longitudinal sides 25. The carriage 50 also comprises third sections 53 which is fixedly connected to and extends substantially vertically upwards from the respective end of the beam 52 to a level which is above the plane of the surface 23. Consequently, the third sections 53 form post members 60 of the support structure 40 extending substantially vertically above the surface 23 on either longitudinal side 25 of the table 20, which post members 60, thanks to the slides 51 being movably arranged in the guide rails 26, are linearly and horizontally moveable along the tabletop 22 in a synchronous manner.

The roller support structure 40 further comprises an actuating arrangement configured to guide the roller 30 in a second, clamping plane being substantially orthogonal to the working surface 23 between a first, raised configuration in which the roller 30 is separated from the surface and a second, clamped configuration in which the roller is actively pressed against the working surface or against an intermediate object, e.g. a workpiece, laying on the working surface.

The actuating arrangement 70 comprises, for each post member 60, a shuttle 80 (see FIG. 7) rotatably supporting the shaft pins, allowing the roller 30 to travel vertically in the post members 60. Each post member 60 comprises an actuating unit 90 for actuating the shuttle 80. An embodiment of such an actuating unit 90 will now be discussed in more detail with reference to FIGS. 3-9.

Figures 5, 6:
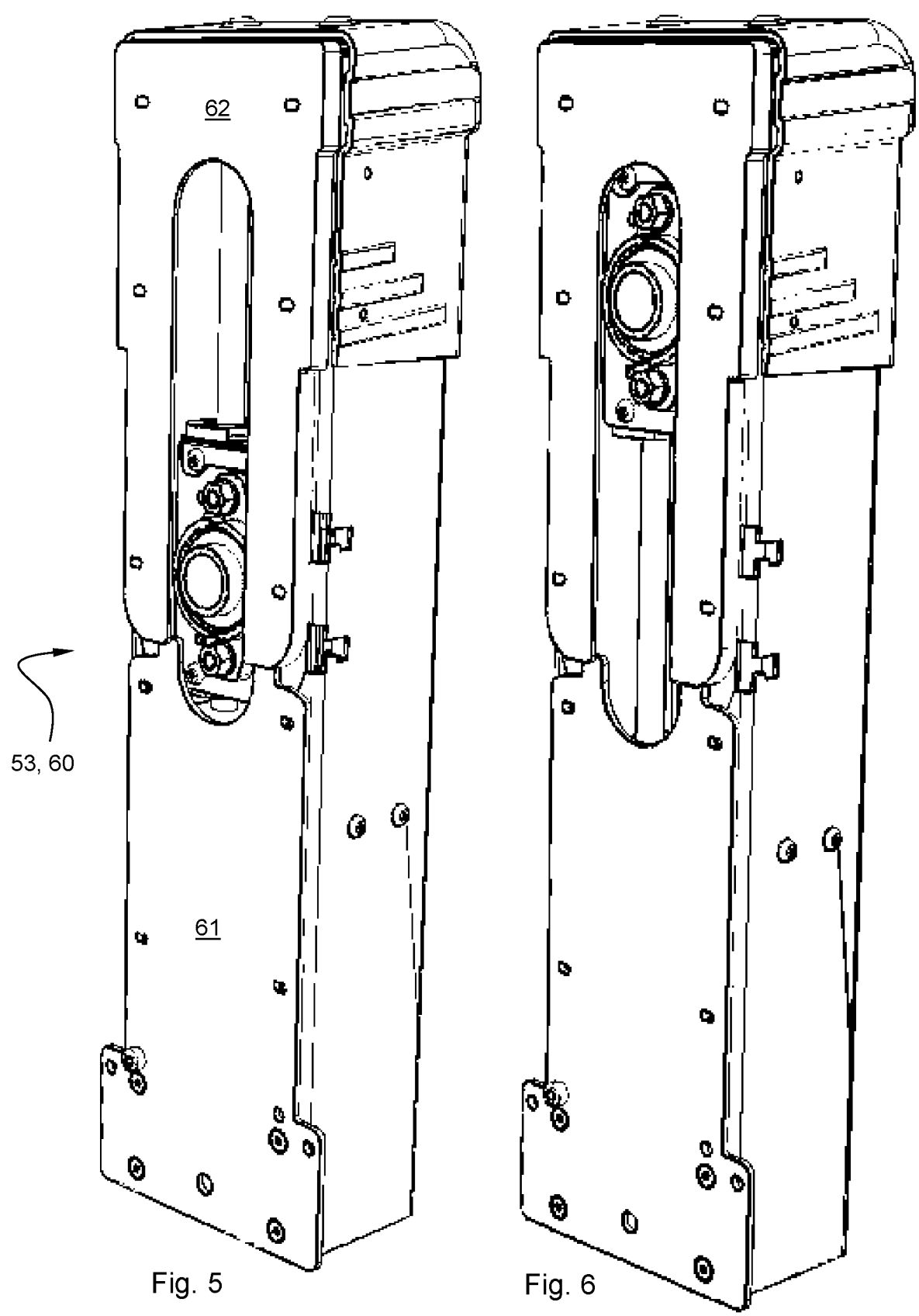
Figure 7:
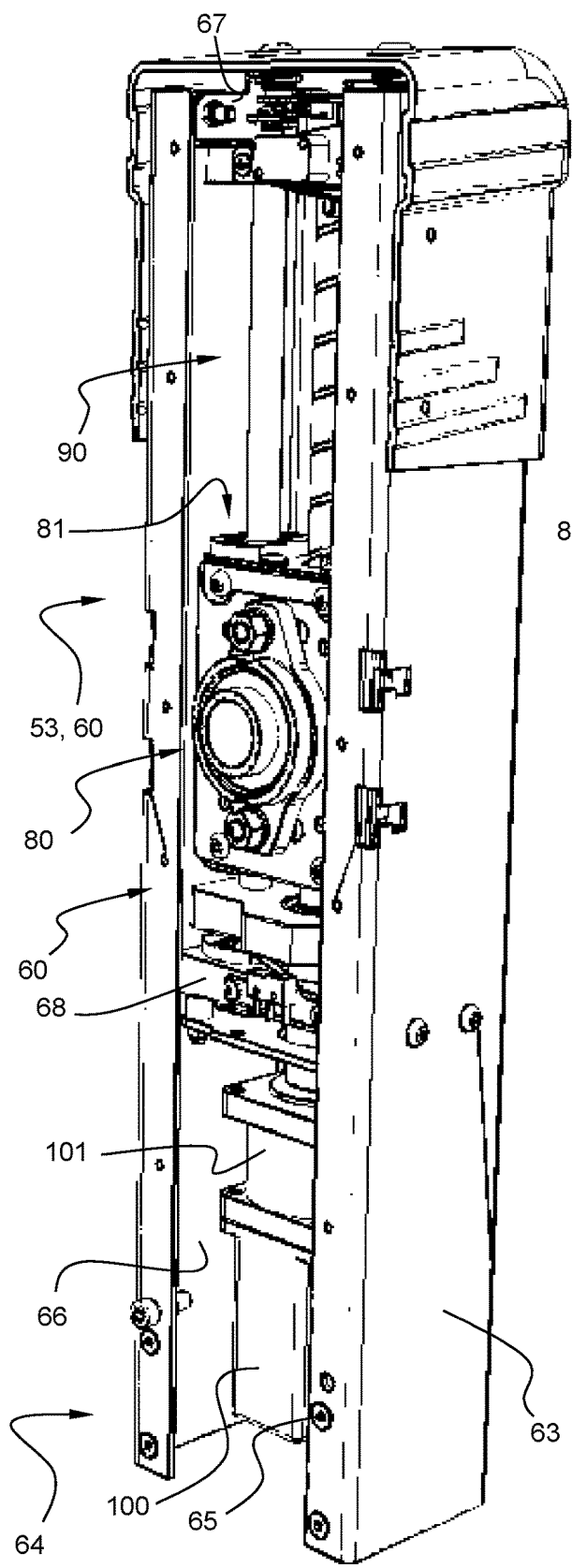
Figure 8:
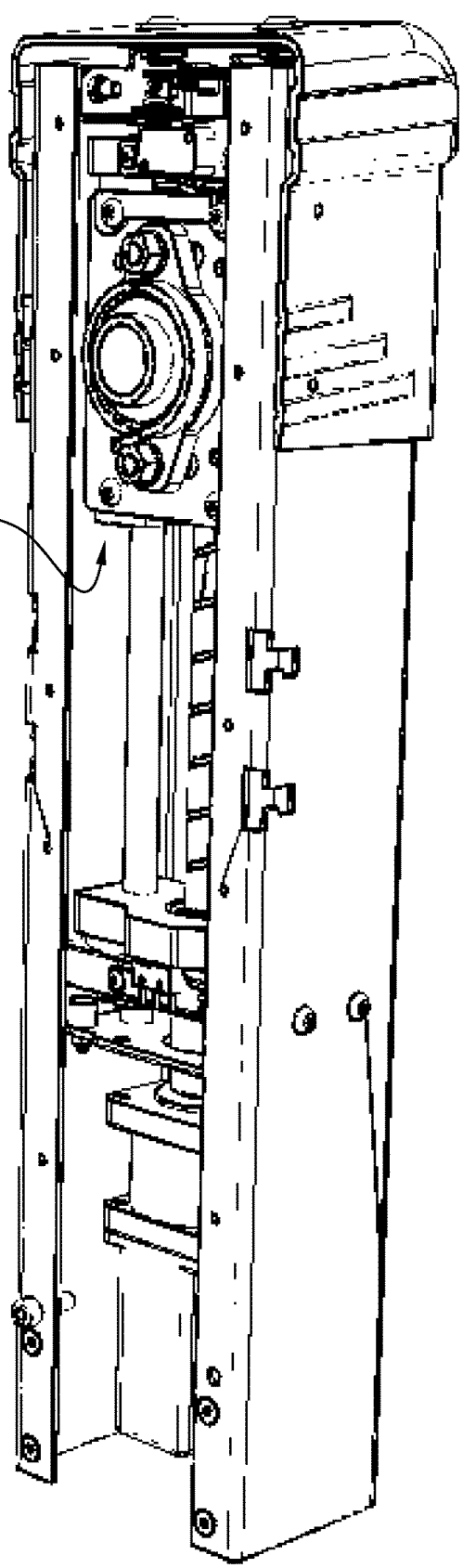
Figure 9:
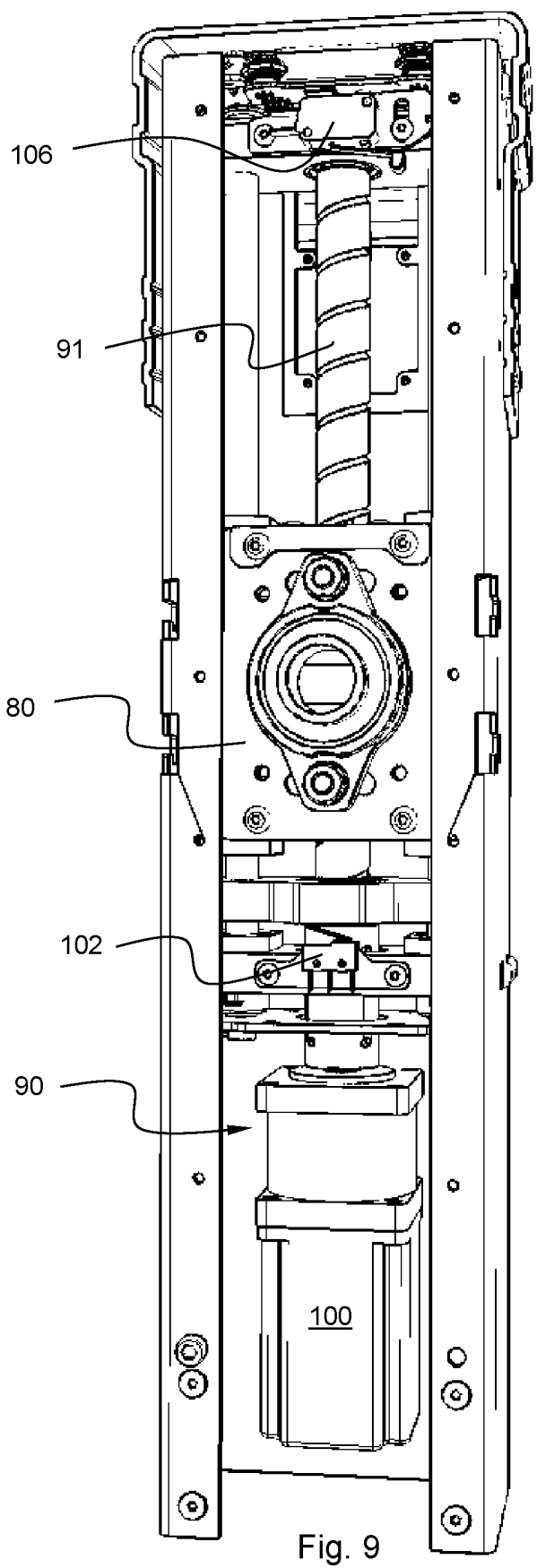

FIGS. 3-9 show an embodiment of a post member 60 in more detail. FIG. 5 shows the post member 60 in a first configuration and FIG. 6 in a second configuration. FIGS. 7 and 8 show the same post member 60 as FIGS. 5 and 6 but with cover plates 61, 62 removed for allowing a better understanding of the inner construction of the post member 60.

The post member 60 comprises a frame member 63 which, in the present embodiment, is formed by bent sheet metal. A lower end 64 of the frame member 63 is configured to be fixedly attached to the beam 52 (also, see FIG. 2). In the present embodiment the frame member 63 comprises through-holes 65 configured to receive bolts for fixedly connecting the frame member 63 to the beam 52. In the present embodiment the frame member 63 defines an inner channel 66 having a substantially rectangular cross-section.

Figure 10:
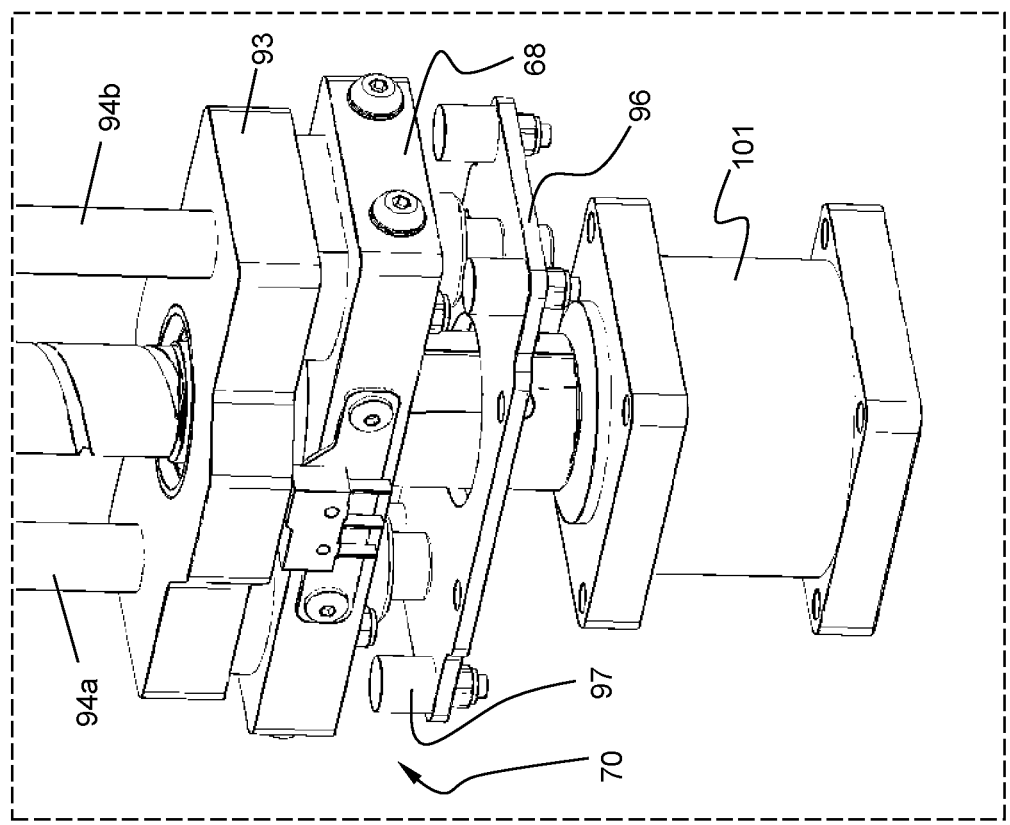
Figure 12:
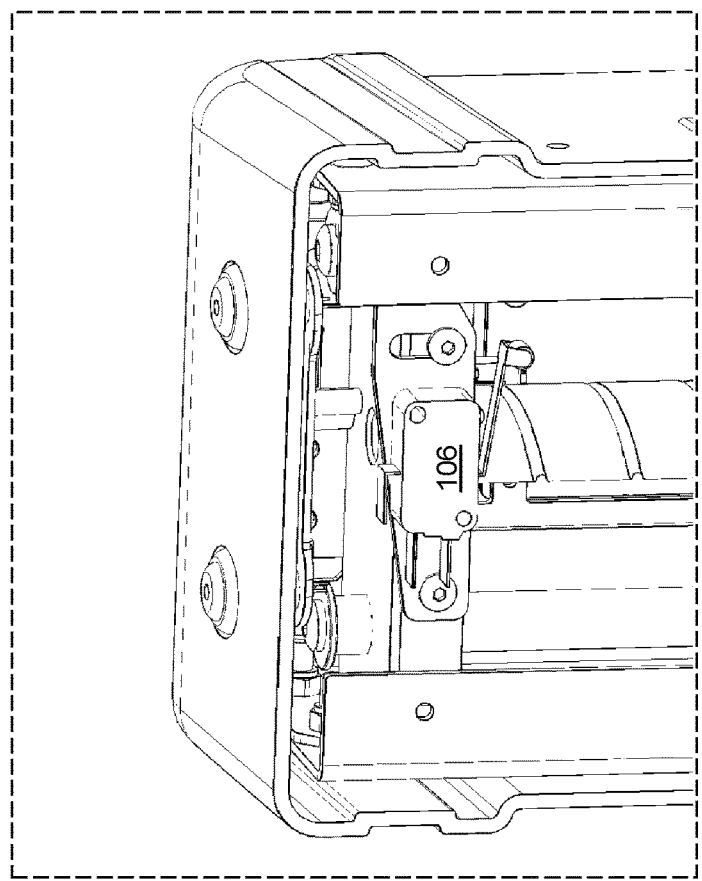
Figure 13:
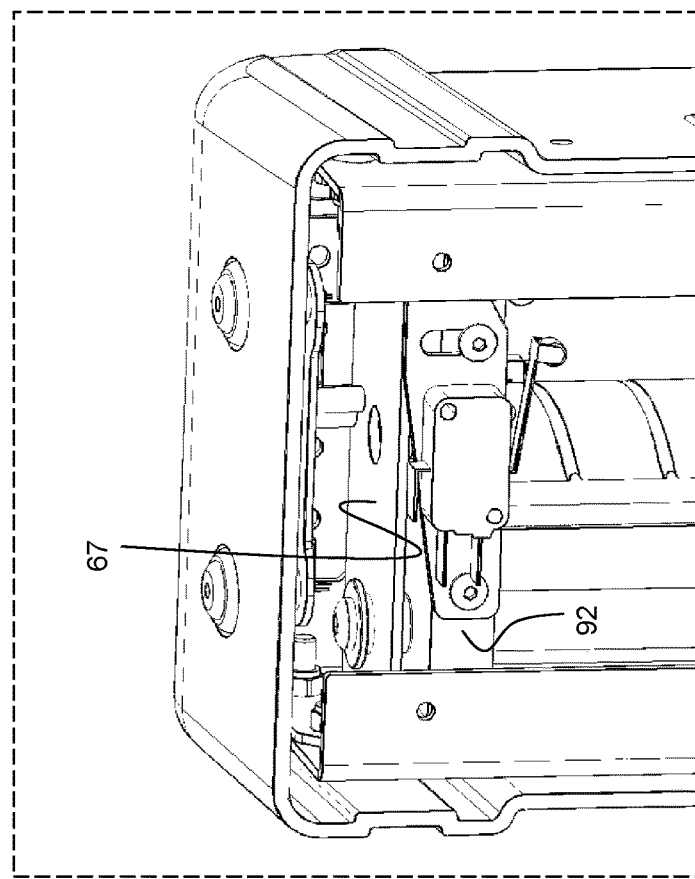

The post member 60 further comprises a first, upper bracket 67 and a second, lower bracket 68, each bracket being fixedly connected to the frame member 63 (see FIGS. 7, 10 and 12). In the present embodiment, the brackets 67, 68 are bolted to the frame member 63.

As previously stated, the roller support structure 40 comprises an actuating arrangement 70 configured to guide the roller 30 vertically over the table 20 between a first, raised configuration and a second, lowered configuration. The actuating arrangement 70 comprises, for each post member 60, a vertically movable shuttle 80 configured to rotatably carry one of said shaft pins 32.

The actuating arrangement 70 further comprises, for each post member 60, an actuating unit 90 configured to actuate the shuttle 80, and thus also the roller 30, vertically in the carriage 50. The actuating unit 90 comprises a rotatable actuator shaft 91 configured to actuate the shuttle 80 vertically in the carriage 50. The actuating unit 90 further comprises a stepping motor 100. The actuator shaft 91 is configured to be actuated by the stepping motor 100, which is controlled by a stepping motor controller 103, e.g. positioned inside or on the beam 52 (see FIG. 2)

In the present embodiment, the actuator shaft 91 is connected to the stepping motor 100 via a gearbox 101. However, in other embodiments the gearbox may be omitted.

In the present embodiment, the actuating unit 90 further comprises a first, upper bearing plate 92 (see FIG. 12), a second, lower bearing plate 93 (see FIG. 10), a first guide rod 94a, a second guide rod 94b and a motor mounting plate 96 (see FIG. 10) arranged inside the frame member 63. The gearbox 101 is mounted on the motor mounting plate 96 and the stepping motor 100 is mounted on the gearbox 101. Consequently, in the present embodiment the motor mounting plate 96 supports the stepping motor 100 via the gearbox 101.

The guide rods 94a, 94b are fixedly connected to the bearing plates 92, 93. The actuator shaft 91, however, is rotatably arranged in the bearing plates 92, 93 but prevented from moving relative to the bearing plates 92, 39 in the axial and radial direction of the actuator shaft 91. In other words, the actuator shaft 91 is allowed to rotate in the bearing plates 92, 93 but cannot move vertically or horizontally in relation to the bearing plates 92, 93. The bearing plates 92, 93 may advantageously be provided with rotational bearings in which the actuator shaft 91 is rotatably arranged. In the present embodiment, the guide rods 94a, 94b are fixedly connected also to the motor mounting plate 96. Consequently, the guide rods 94a, 94b, the bearing plates 92, 93, the motor mounting plate 96, the gearbox 101 and the stepping motor 100 form a fixedly arranged assembly in which the actuator shaft 91 is rotatably but otherwise fixedly arranged.

The shuttle 80 is configured to be slidably guided along the guide rods 94a, 94b. In the present embodiment the shuttle 80 comprises a first upper 81 and a second, lower 82 glide beam (see FIGS. 7 and 8) configured to slidably receive the guide rods 94a, 94b, thus allowing the shuttle 80 to slide along the guide rods 94a, 94b.

The actuator shaft 91 may preferably be a ball screw shaft having a pitch within the range of 10-30 mm and being configured to interact with a ball screw nut being fixedly attached to the shuttle 80, e.g. arranged in any or both of the glide beams 81, 82. However, other types of mechanical linear actuators configured to translates rotational motion to linear motion may be used.

The guide rods 94a, 94b are arranged in the upper 67 and lower 68 brackets in such a manner that they are allowed to move axially in relation to the brackets 67, 68. However, the brackets 67, 68 restrict movement of the guide rods 94a, 94b in the radial direction. In other words, the guide rods 94a, 94b are arranged to move vertically in the brackets 67, 68 but are prevented from moving horizontally.

In the present embodiment the vertical movability of the guide rods 94a, 94b in relation to the brackets 67, 68 is realised by providing the brackets 67, 68 with through-openings and arranging the guide rods 94a, 94b such that they run through the through-openings. The through-openings in the lower bracket 68 are provided with low friction bushings 69a, 69b supporting the guide rods 94a, 94b radially but allowing axial movement of the guide rods 94a, 94b (see FIGS. 10 and 11).

Figure 11:
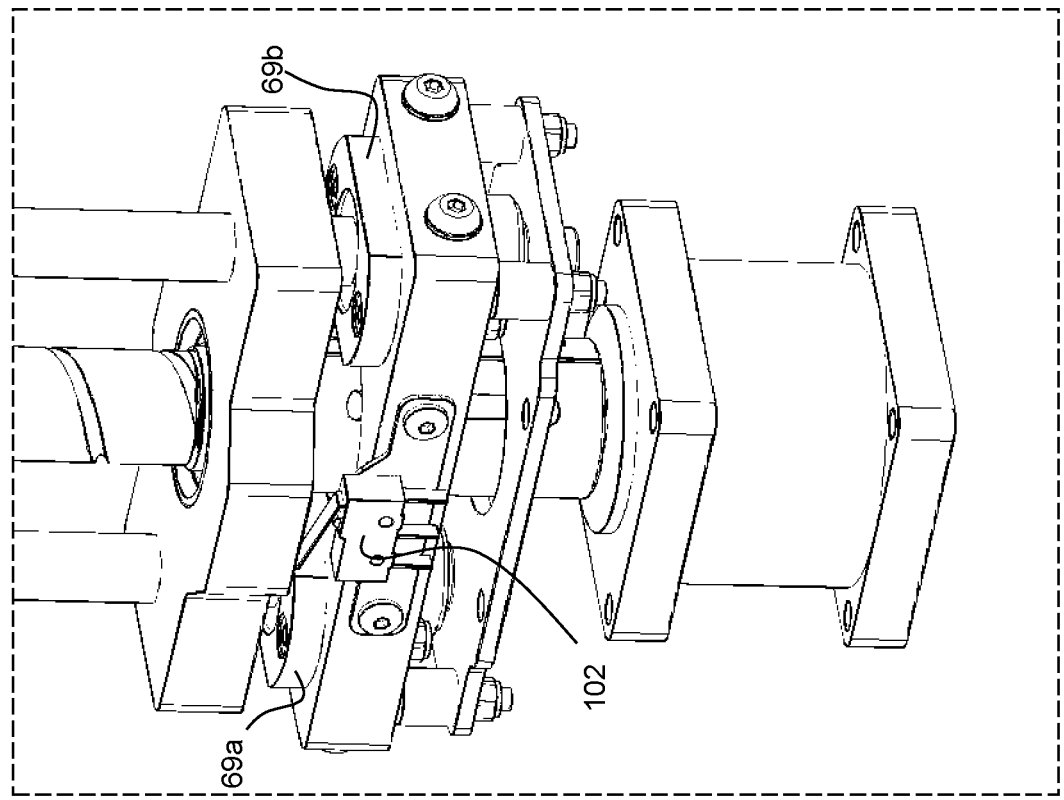
FIG. 10-13 illustrate an embodiment of an actuating assembly of a flatbed applicator, In the drawings, like reference numerals are used to indicate common parts, elements or features unless otherwise explicitly stated or implicitly understood from the context.

As is most clearly seen in FIGS. 10 and 11, the lower bearing plate 93 is arranged above the lower bracket 68 and the motor mounting plate 96 is arranged below the same. Consequently, the actuating unit 90, by virtue of the guide rods 94a, 94b being fixedly connected to the lower bearing plate 93 and to the motor mounting plate 96, is movable, in relation to the lower bracket 68 and, consequently, also in relation to the frame member 63, between a lowermost position or configuration, disclosed in FIG. 10, and an uppermost position or configuration, disclosed in FIG. 11. In the lowermost configuration, the lower bearing plate 93 is in contact with the lower bracket 68 (or to be more precise, with the bushings 69a, 69b of the lower bracket 93). In the uppermost configuration, the motor mounting plate 96 is in contact with the lower bracket 68 (or to be more precise, stoppers 97 of the motor mounting plate 96 are in contact with the lower bracket 68). Consequently, as is evident from FIGS. 10 and 11, allowed vertical travel of the actuating unit 90 in the frame member 63 is dictated by the distance, in the axial direction of the guide rods 94a, 94b, between the lower bearing plate 93 and the motor mounting plate 96.

A switch 102, the function of which will be discussed in more detail below, is fixedly mounted in the post member 60—in this case on the lower bracket 68.

Operation of the actuating arrangement 70 will now be described in more detail starting from a starting configuration of the flatbed applicator 10 where the roller 30 in an uppermost position, e.g. as is shown in FIG. 1. In the starting configuration, the shuttles 80 in both post members 60 will be as disclosed in FIGS. 6 and 8 and, consequently, the roller 30 will be at its uppermost position. Also, due to the combined weight of the roller 30 and the actuating unit 90, the lower bearing plate 93 will be in contact with the lower bracket 68, as is disclosed in FIG. 10.

In order to lower the roller 30, an operator will activate the stepping motor 100 in each post member 60 such that it rotates the actuator shaft 91 anti-clockwise (as seen from above). The actuator shaft 91 will then actuate the shuttle 80, and consequently also the roller 30 downwards towards the surface 23. The combined weight of the roller 30 and the actuating unit 90 will maintain the lower bearing plate 93 in contact with the lower bracket 68 during this downward movement of the shuttle 80/roller 30.

The downward movement of the shuttle 80/roller 30 will continue as long as the stepping motor is activated and until the roller 30 is brought into direct contact with the surface 23 or into contact with a workpiece laying on the surface (indirect contact with the surface). At this point in time, the roller 30 cannot continue its downward movement and, instead, continued rotation of the actuator shaft 91 will force the whole actuating unit 90 upwards, causing the lower bearing plate 93 to separate from the lower bracket 68 and the switch 102 to be activated, as is disclosed in FIG. 11. Consequently, the switch 120 is activated at the point in time when the roller 30 is brought into direct or indirect contact with the working surface.

Activation of the switch 102 will cause the stepping motor controller 103 to trigger the stepping motor 100 to effectuate a predetermined number of final stepping steps, after which sequence of final stepping steps rotation of the actuator shaft 97 is halted. The position of the switch 102 is configured such that the switch 102 is activated at the point in time, or shortly before, the motor mounting plate 96 (or more precise in the present embodiment, the stoppers 97 of the motor mounting plate 96) is (are) brought into contact with the lower bracket and further upward movement of the actuating unit is prevented. Further rotation of the actuator shaft 91 will then result in the roller 30 being pressed against the surface (directly or indirectly), and the predetermined number of final stepping steps will determine the force by which the roller 30 affects the surface, directly or indirectly. By increasing the predetermined number of final stepping steps, a higher pressing force can be achieved and vice versa. In other words, it is understood that, for a given roller configuration, the larger number of final stepping motor steps ordered by the stepping motor controller, the higher final pressing force between the roller and the surface.

At the end of the sequence of final stepping motor steps, the stepping motor will stop rotating and the roller will be held in a clamped configuration by virtue of the inherent ability of the stepping motor to hold a step position.

It has been found that this configuration provides a precise way of setting a desired pressing force or linear pressure (N/mm) of the roller 30 without having to implement a feedback loop measuring the pressing force or linear pressure.

For a particular roller configuration, the stepping motor controller may be provided with a lock-up table mapping the number of final stepping motor steps to the final pressing force or linear load effectuated by the roller 30. Prior to a pressing operation, the operator can set the final pressing force or linear load and the stepping motor controller 103 will then adapt the final number of stepping motor steps accordingly, i.e. how many steps the stepping motor is to take after the switch 102 has been triggered.

According to one embodiment, the switch is configured to be activated simultaneously as, or substantially simultaneously as, the motor mounting plate (or the stoppers of the motor mounting plate) is (are) brought into contact with the lower bracket. In this embodiment, all of the final stepping motor steps will contribute to pressing the roller 30, directly or indirectly, down onto the surface 23.

According to one embodiment, the stepping motor controller 103 may comprise a central processing unit, e.g. a computer or a micro controller. The stepping motor controller may also be connected to input means, e.g. control buttons 104 (see FIG. 3), allowing an operator to input instructions to the controller, e.g. instructions to lower or raise the roller, or sett operating parameters, e.g. desired clamping pressure as dictated by the predetermined number of final stepping motor steps. The stepping motor controller may also be connected to output means 105, e.g. a display, allowing the operator to receive information on set parameter values or confirmations on input commands.

Input and output means may be provided in each post member 60, thus allowing the operator to control the actuating arrangement from both longitudinal sides of the table.

The stepping motor controller 103 may be configured to monitor the switch 102 associated with each actuating unit 90, e.g. with each post member 60, and, upon receiving an activation signal from either switch indicating that the roller 30 has been brought into direct or indirect contact with the working surface 23, to instruct the stepping motor associated with each actuating unit to perform said predetermined number of final stepping motor steps in parallel to bring the stepping motors to actuate the shuttles 80 synchronically and/or in unison. Consequently, according to this configuration the first switch to be actuated will initiate the clamping of the roller 30 by triggering the stepping motors 100 in both post members 60 to perform the predetermined number of final stepping motor steps to press the roller 30 directly or indirectly against the surface 23. The other switch, if subsequently activated, will not trigger any action on the part of the stepping motors.

Once the sequence of final stepping motor steps is initiated, the stepping motors 100 in the post members 60 may be configured to perform said predetermined number of final stepping motor steps synchronically and/or in unison.

In FIGS. 2-13 only one of the post members 60 is disclosed. It is to be understood, however, that in the disclosed embodiment, the flatbed applicator 10 comprises two post members which are substantially mirror-symmetric but otherwise identical. Consequently, the actuating arrangement configured to guide the roller in the clamping plane comprises, in this embodiment:

a first actuating unit comprising a first rotatable actuator shaft configured to linearly actuate the first shuttle in said clamping plane, the first actuator shaft being rotatably actuated by a first stepping motor;

a first switch configured to be activated when the roller is brought into direct or indirect contact with the surface to trigger or instruct the first stepping motor to perform a predetermined number of final stepping motor steps to press the roller (30) directly or indirectly against the surface to bring the roller to the clamped configuration;

a second actuating unit comprising a second rotatable actuator shaft configured to linearly actuate the second shuttle (80) in said clamping plane, the second actuator shaft being rotatably actuated by a second stepping motor; and a second switch configured to be activated when the roller is brought into direct or indirect contact with the surface to trigger or instruct the second stepping motor to perform a predetermined number of final stepping motor steps to press the roller directly or indirectly against the surface to bring the roller to the clamped configuration.

At least one of the first switch and the second switch may be configured to be activated when the roller 30 is brought into direct or indirect contact with the working surface 23 to trigger or instruct the first stepping motor and the second stepping motor to perform said predetermined number of final stepping motor steps synchronically and/or in unison.

For each actuating unit, the actuating arrangement may comprise, for each post member 60, a further switch 106 (see FIGS. 9 and 13) arranged to detect when the shuttle 80 is in the raised position. These further switches 106 may allow the stepping motor controller 103 to synchronise the stepping motors 100 to a common, known roller position.

The further switch may be arranged on the upper bracket 67. Like the first-mentioned switch, the further switch may be a contact switch or a proximity switch.

Horizontal movement of the roller 30 and roller support structure 40 across the table 20 may be realised by an operator manually pushing or pulling the roller and roller support structure across the table. Alternatively, horizontal actuation of the roller 30 and roller support structure 40 may be realised using any suitable motor arrangement known in the art, preferably comprising an electric motor. Different types of such motor arrangements are known in the art and will not be discussed further here.

In the preceding description, various aspects of the apparatus according to the invention have been described with reference to the illustrative drawings. For purposes of explanation, specific numbers, systems, and configurations were set forth in order to provide a thorough understanding of the flatbed applicator and its workings. However, this description is not intended to be construed in a limiting sense. Various modifications and variations of the illustrative embodiment, as well as other embodiments of the apparatus, which are apparent to person skilled in the art to which the disclosed subject-matter pertains, may lie within the scope of the present invention as defined by the following claims.

The invention claimed is:

1. A flatbed applicator comprising:
   a table comprising a tabletop displaying a substantially planar working surface;
   a roller; and
   a roller support structure comprising:
      a carriage configured to guide the roller in a first, rolling plane being substantially parallel to the working surface; and
      an actuating arrangement configured to guide the roller in a second, clamping plane being substantially orthogonal to the working surface between a first, raised configuration in which the roller is separated from the working surface and a second, clamped configuration in which the roller is actively pressed against the working surface or against an intermediate object laying on the working surface,
   wherein the actuating arrangement comprises:
      a pair of shuttles rotatably carrying the roller; and
      for each shuttle in said pair of shuttles:
         an actuating unit comprising a rotatable actuator shaft configured to linearly actuate the shuttle in said clamping plane, the actuator shaft being rotatably actuated by a stepping motor; and
         a switch configured to be activated when the roller is brought into direct or indirect contact with the working surface to trigger or instruct the stepping motor to perform a predetermined number of final stepping motor steps to press the roller directly or indirectly against the working surface.

2. The flatbed applicator according to claim 1, wherein the actuating unit associated with each shuttle is movably arranged in relation to the carriage to allow the actuating unit, when the roller is brought into direct or indirect contact with the working surface, to move to activate said switch.

3. The flatbed applicator according to claim 1, wherein the actuating arrangement comprises a stepping motor controller configured to monitor the switch associated with each actuating unit and, upon receiving an activation signal from either switch indicating that the roller has been brought into direct or indirect contact with the working surface, to instruct the stepping motor associated with each actuating unit to perform said predetermined number of final stepping motor steps to bring the stepping motors to actuate the shuttles synchronically and/or in unison.

4. The flatbed applicator according to claim 1, wherein the actuating arrangement comprises an input unit allowing an operator to set said predetermined number of final stepping motor steps.

5. The flatbed applicator according to claim 1, wherein the rotatable actuator shaft is a ball screw shaft configured to interact with a ball screw nut being connected to the shuttle.

6. The flatbed applicator according to claim 1, wherein the actuating arrangement is arranged in the carriage.

7. The flatbed applicator according to claim 1, wherein the stepping motor associated with each actuating unit is supported by the actuating unit.

8. The flatbed applicator according to claim 1, wherein the switch is fixedly attached to the carriage.

9. The flatbed applicator according to claim 1, wherein the carriage comprises a frame member and first and second brackets, each bracket being fixedly attached to the frame member, wherein said switch is supported by the second bracket,
   and in that the actuating unit associated with each shuttle comprises first and second guide rods, first and second bearing plates and a motor mounting plate, wherein the guide rods are horizontally supported by but arranged vertically movable in the first and second brackets, wherein said actuator shaft is rotatably supported by but horizontally fixedly arranged in the first and second bearing plates, and wherein the first and second bearing plates and the motor mounting plate are fixedly attached to the guide pipes, and wherein said stepping motor is supported by the motor mounting plate.

10. The flatbed applicator according to claim 9, wherein the second bracket is arranged below the second bearing plate limiting vertical movement of the actuating unit in the downward direction.

11. The flatbed applicator according to any one of claims 9 and 10, wherein the second bracket is arranged above the motor mounting plate limiting vertical movement of the actuating unit in the upward direction.

12. The flatbed applicator according to claim 1, wherein said pair of shuttles comprises a first shuttle rotatably carrying the roller at a first end of the roller and a second shuttle rotatably carrying the roller at a second end of the roller, wherein the actuating arrangement comprises:

a first actuating unit comprising a first rotatable actuator shaft configured to linearly actuate the first shuttle in said clamping plane, the first actuator shaft being rotatably actuated by a common stepping motor or by a first stepping motor;

a first switch configured to be activated when the roller is brought into direct or indirect contact with the working surface to trigger or instruct the stepping motor actuating the first rotatable actuator shaft to perform a predetermined number of final stepping motor steps to press the roller directly or indirectly against the working surface to bring the roller to the clamped configuration;

a second actuating unit comprising a second rotatable actuator shaft configured to linearly actuate the second shuttle in said clamping plane, the second actuator shaft being rotatably actuated by the common stepping motor or by a second stepping motor; and a second switch configured to be activated when the roller is brought into direct or indirect contact with the working surface to trigger or instruct the stepping motor actuating the second actuator shaft to perform a predetermined number of final stepping motor steps to press the roller directly or indirectly against the working surface to bring the roller to the clamped configuration.

13. The flatbed applicator according to claim 12, wherein at least one of the first switch and the second switch is configured to be activated when the roller is brought into direct or indirect contact with the surface to trigger or instruct the first stepping motor and the second stepping motor to perform said predetermined number of final stepping motor steps synchronically and/or in unison.

14. A method of actuating a roller in a flatbed applicator in a clamping plane which is substantially orthogonal to a substantially planar working surface of a table of the flatbed applicator, comprising the steps of:

using a stepping motor, actuating the roller into direct or indirect contact with the working surface; and upon said direct or indirect contact between the roller and the working surface, triggering or instructing the stepping motor to perform a predetermined number of final stepping motor steps to press the roller directly or indirectly against the working surface to bring the roller to a clamped configuration.

15. The method according to claim 14, wherein the flatbed applicator comprises an actuating arrangement comprising:

a pair of shuttles rotatably carrying the roller; and for each shuttle in said pair of shuttles:

an actuating unit comprising a rotatable actuator shaft configured to linearly actuate the shuttle in said clamping plane, the actuator shaft being rotatably actuated by a stepping motor; and a switch configured to be activated when the roller is brought into direct or indirect contact with the working surface to trigger or instruct the stepping motor to perform a predetermined number of final stepping motor steps to press the roller directly or indirectly against the working surface to bring the roller to the clamped configuration, the method comprising the steps of:

the switch being activated upon said direct or indirect contact between the roller and the working surface, and the switch, upon being activated, triggering or instructing the stepping motor to perform said predetermined number of final stepping motor steps.

16. The method according to claim 15, comprising the steps of:

actuating the roller into direct or indirect contact with the working surface using:

a first stepping motor or a common stepping motor configured to actuate the first actuator shaft; and a second stepping motor or the common stepping motor configured to actuate the second actuator shaft; and upon said direct or indirect contact between the roller and the working surface, triggering or instructing the common stepping motor to perform said predetermined number of final stepping motor steps, or triggering or instructing the first stepping motor and the second stepping motor to perform said predetermined number of final stepping motor steps synchronically and/or in unison.

\* \* \* \* \*